United States Patent
Malpani et al.

(10) Patent No.: US 11,238,080 B2
(45) Date of Patent: *Feb. 1, 2022

(54) AGGREGATING ACTIVITY DATA FOR MULTIPLE USERS

(71) Applicant: Google LLC, Mountain View, CA (US)

(72) Inventors: Radhika Malpani, Palo Alto, CA (US); Elin R. Pedersen, Portola Valley, CA (US)

(73) Assignee: Google LLC, Mountain View, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/426,754

(22) Filed: May 30, 2019

(65) Prior Publication Data

US 2019/0278794 A1 Sep. 12, 2019

Related U.S. Application Data

(63) Continuation of application No. 13/778,627, filed on Feb. 27, 2013, now Pat. No. 10,353,938.

(60) Provisional application No. 61/605,950, filed on Mar. 2, 2012.

(51) Int. Cl.
*G06F 16/35* (2019.01)
*G06F 16/9535* (2019.01)

(52) U.S. Cl.
CPC .......... *G06F 16/35* (2019.01); *G06F 16/9535* (2019.01)

(58) Field of Classification Search
CPC ....... G06F 16/68; G06F 16/9554; G06F 16/35
See application file for complete search history.

(56) References Cited

U.S. PATENT DOCUMENTS

| | | | |
|---|---|---|---|
| 8,180,778 B1 | 5/2012 | Pedersen et al. | |
| 8,380,554 B2 | 2/2013 | Vojnovic et al. | |
| 2001/0044795 A1 | 11/2001 | Cohen et al. | |
| 2003/0067554 A1 | 4/2003 | Klarfeld et al. | |
| 2008/0097987 A1 | 4/2008 | Shih et al. | |
| 2009/0222750 A1* | 9/2009 | Jain | G06Q 10/00 715/767 |
| 2009/0240516 A1* | 9/2009 | Palestrant | G06Q 30/0281 705/346 |
| 2010/0063969 A1* | 3/2010 | Kasargod | G06Q 30/02 707/740 |
| 2012/0272160 A1* | 10/2012 | Spivack | H04L 51/32 715/752 |
| 2013/0029769 A1 | 1/2013 | Lee | |
| 2013/0066961 A1 | 3/2013 | Naik et al. | |

(Continued)

*Primary Examiner* — Mariela Reyes
*Assistant Examiner* — Courtney Harmon
(74) *Attorney, Agent, or Firm* — Middleton Reutlinger

(57) ABSTRACT

Methods, systems, and apparatus, including computer programs encoded on a computer storage medium, for aggregating task data for multiple users. In one aspect, a method includes accessing action trail data that corresponds to a task and resources related to that task, wherein each task relates to one or more related topics and is defined by a sequence of user actions corresponding to the resources related to that task; clustering the action trails based on the action trail data such that each action trail cluster corresponds to a particular task and includes the action trails corresponding to that particular task; and for each action trail cluster, ranking the resources that correspond to the included action trails according to the topics of the particular task.

20 Claims, 8 Drawing Sheets

(56) References Cited

U.S. PATENT DOCUMENTS

2013/0166525 A1\* 6/2013 Naranjo ................ G06F 16/951
                                                    707/706
2013/0173573 A1\* 7/2013 Song ..................... G06F 16/951
                                                    707/706

\* cited by examiner

AGGREGATING ACTIVITY DATA FOR MULTIPLE USERS

CROSS-REFERENCE TO RELATED APPLICATIONS

This application is a continuation application of, and claims priority to, U.S. patent application Ser. No. 13/778,627, titled "AGGREGATING ACTIVITY DATA FOR MULTIPLE USERS," filed on Feb. 27, 2013, which application claims priority to and the benefit under 35 U.S.C. § 119(e) of provisional U.S. Patent Application No. 61/605,950, entitled "AGGREGATING ACTIVITY DATA FOR MULTIPLE USERS," filed Mar. 2, 2012. The disclosure of each of the foregoing applications is incorporated herein by reference.

BACKGROUND

This specification relates to activity-based segmentation of user histories.

The Internet provides access to a wide variety of resources, for example, video or audio files, web pages for particular subjects, book articles, and news articles. The World Wide Web (the web) is large and complex. In the process of conducting research on a topic of interest, a user may navigate the web and in doing so will often browse through many resources.

Often users research a particular topic (or topics) over a series of days or even weeks, and do so concurrently without knowledge of other users' research findings. The act of gathering information for a particular topic, or one or more related topics, is referred to as a "task." In general, a task encompasses the acts of issuing queries and selecting (and not selecting) resources that a search engine determines to be responsive to the queries. A task generally relates to one or more related topics, and a user may be engaged in multiple tasks. For example, assume a user, over the course of several days or weeks, is planning a trip to Kenya and is also planning a child's summer. For each task—the Kenya trip and the children's summer activities—the user issues queries and selects resources that map into multiple sessions over the several days or weeks. Likewise, each task may relate one or more topics, e.g., horseback riding and canoeing for the summer activities, and flights, hotels, safaris and immunizations for the Kenya trip.

Typical web browsers can retain the user's browser history. In addition to these client based histories, the user can also use server or cloud based services (e.g., Google Web History). Reviewing web histories enables the user to recall particular resources that the user may have found to be very informative for a particular topic. However, such chronological histories provide a list of user actions in the order they occurred, and do not partition the histories by task.

SUMMARY

In general, one innovative aspect of the subject matter described in this specification can be embodied in methods that include the actions of accessing action trail data that corresponds to a task and resources related to that task, wherein each task relates to one or more related topics and is defined by a sequence of user actions corresponding to the resources related to that task; clustering the action trails based on the action trail data such that each action trail cluster corresponds to a particular task and includes the action trails corresponding to that particular task; and for each action trail cluster, ranking the resources that correspond to the included action trails according to the topics of the particular task. Other embodiments of this aspect include corresponding systems, apparatus, and computer programs, configured to perform the actions of the methods, encoded on computer storage devices.

These and other embodiments can each optionally include one or more of the following features. Each action trail cluster may comprise one or more action trails corresponding to the particular task of the action trail cluster, and each of the one or more action trails may meet a similarity threshold for the action trail cluster to which the action trail belongs.

Each action trail cluster may be associated with a cluster identifier, the cluster identifier being based on the particular task corresponding to the action trail cluster.

Each topic may be associated with one or more resources to which the action trails included in the action trail cluster correspond and that meet a similarity threshold for that topic.

Ranking the resources may further comprise ranking the resources according to a click through rate associated with each resource, the click through rate being a rate at which a resource is selected when presented to a user in response to a query.

The actions may further comprise: determining whether a user is engaged in a task, and in response to determining that the user is engaged in a particular task: identifying an action trail cluster that corresponds to the particular task; identifying at least one resource corresponding to an action trail that corresponds to the identified action trail cluster as a task relevant resource; and providing data identifying the at least one task relevant resource.

Determining that the user is engaged in a task may comprise receiving explicit user feedback indicating that the user is engaged in a task. Determining that the user is engaged in a task may be based on the user's resource access history, the resource access history describing one or more user actions, each user action being associated with a resource upon which the user action is performed.

Identifying the at least one task relevant resource may comprise identifying at least one task relevant resource based on the ranking of the resources according to each corresponding topic of the identified action trail cluster. Identifying the at least one task relevant resource may comprise identifying at least one task relevant resource from each topic of the identified action trail cluster.

The actions may further comprise: receiving data identifying a query relevant resource that is determined to be responsive to a query; and wherein determining whether a user is engaged in a task comprises determining whether a user associated with the query is engaged in a task; identifying an action trail cluster comprises identifying an action trail cluster including an action trail for which the query relevant resource is a corresponding resource; identifying at least one resource comprises identifying at least one other corresponding resource for an action trail that belongs to the identified action trail cluster as a task relevant resource; and providing data comprises providing data identifying the at least one task relevant resource in response to the query.

At least one resource identified as a task relevant resource may be associated with a first topic that is different from a second topic associated with the query relevant resource.

Providing data identifying the at least one task relevant resource may comprise: providing data for generating a display of a topic environment to the user, wherein the topic environment includes references to resources corresponding to action trails included in the action trail cluster associated with the particular task.

The topic environment may include a plurality of reference groups and each reference group may correspond to a particular topic of the action trail cluster, and each reference group may include one or more references to resources corresponding to the particular topic of the action trail cluster associated with the particular task.

Particular embodiments of the subject matter described in this specification can be implemented so as to realize one or more of the following advantages. The subject matter described in this specification may combine detailed research conducted by multiple users to help a particular user locate relevant information that he or she may have otherwise not located. In particular, the system implements a "crowdsourcing" technique that aggregates data for related topics for multiple users and identifies information that is relevant to a task from the aggregated data. The relevant information can be identified and presented to a user even when the user issues queries that do not, by themselves, result in the search engine identifying the relevant information for the user. Additionally, combining task data for multiple users also identifies particular topics associated with a task, which further satisfies the informational needs of users by informing users of relevant topics for a particular task.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
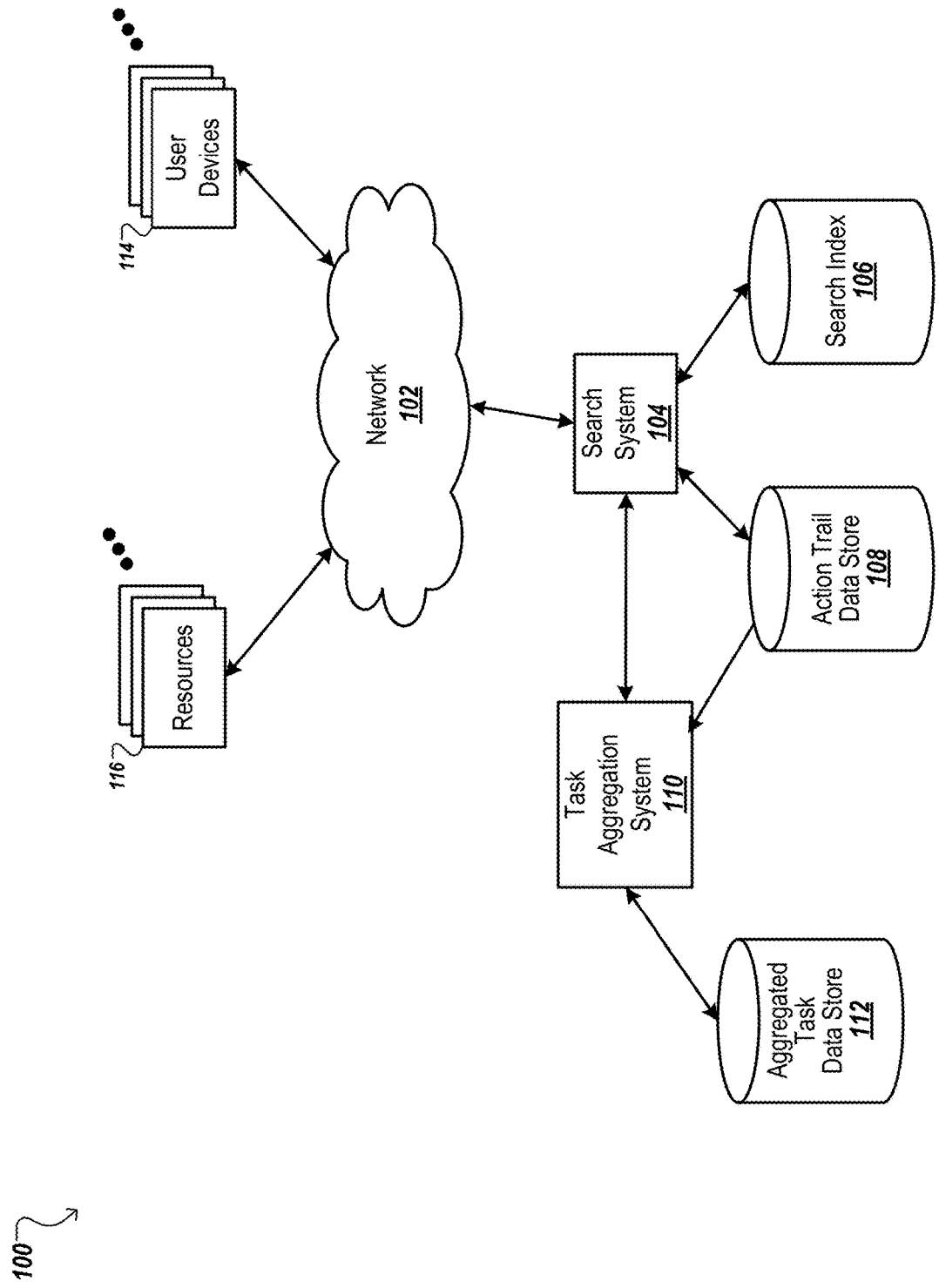
FIG. 1 is a block diagram of an example environment in which a task aggregation system aggregates task data from tasks of multiple users.

Some search systems can organize the user's history into "action trails." Each action trail corresponds to one or more related topics of a task and to resources relating to those topics, and is defined by a sequence of user actions taken by the user that correspond to the resources. While this is very helpful in organizing the user's personal history, the user must still search the web and read numerous resources to find the relevant information.

Furthermore, when a user is researching a task, the user will often issue multiple queries for each topic to which the task relates and manually browse resources presented in response to the queries. Because the user may not know what search queries to enter, or because the user may not be familiar with the resources presented in response to each query, the user may not discover resources which are particularly relevant to their task. For example, with respect to the task of planning a trip to Kenya, the user may overlook immunization requirements. Likewise, when planning the child's summer, the user may not discover a particularly highly-rated horseback riding camp because it was not presented as a summer camp for children. Thus, even when the search system can organize information for each of the user's particular tasks, the user still may not discover particular resources that are relevant for each task. This is especially so if there is no preexisting ontology by which the activities can be classified. In particular, the activities of many different users define activity patterns that arise out of many relatively simple interactions. While recognizable but complex sets of activities may emerge from the many different interactions, the relationship among the activities can often be difficult, if not impossible, to classify a priori.

This specification describes technologies relating to activity-based user histories. Complex sets of activities are compared and, based on the comparisons, a collection of related topics and corresponding resources identified from the particular tasks of users emerges. The emergence can occur based on user actions or inaction, without a preexisting ontology. To illustrate, the scenario where a user performs web research is described. A user uses a search engine to find the resources the user needs to plan a trip to Kenya. The task of planning the trip includes visiting many web pages, issuing multiple search engine queries, clicking on multiple web page hyperlinks, viewing various images, watching videos, etc.

In addition to the particular user planning a trip to Kenya, there are many other users that have previously planned or are engaged in the task of planning a trip to Kenya. The search engine aggregates topic data describing the other users' research and the particular user's research to form a combined set of task data relating to Kenya travel. In some implementations, data concerning user research may be anonymized using conventional methods.

Once the research of users has been combined, the particular user researching a trip to Kenya may be provided with an identification of resources (e.g., links, search results, etc.) that previous users found relevant to the task of planning a trip to Kenya. These resources can be identified based on the combined topic data, and thus may be identified for a user despite the user having not issued a query that would otherwise be required for the search engine to identify the resource. Relevant resources from other users' research may be further focused to the particular stage of research by also filtering based on temporal activity data.

For example, a user beginning research on a safari trip to Kenya may have only planned on searching for safari packages, flights and hotels, but may not have considered searching for other information relevant to the task of planning a trip to Kenya (e.g., resources related to restaurants, travel visas, medical immunizations, exchange rates, etc.). In addition, while the user might indeed find resources related to flights and hotels in Kenya, those resources may not be as useful as the resources other users planning a trip to Kenya found.

Over the course of one or more search sessions, the user submits queries and takes actions that the search engine determines to be related to the task of Kenya travel. Accordingly, the search engine identifies resources and, optionally, topics related to Kenya travel, and provides this information to the user. Thus, the search engine provides the user with the information that is determined to be very relevant to the task by aggregating (e.g., crowdsourcing) previous users' research.

These and other features are described in more detail in the sections that follow.

FIG. 1 is a block diagram of an example environment 100 in which a task aggregation system 110 aggregates topic data from topics of multiple users. The example environment 100 includes a network 102, such as a local area network (LAN), a wide area network (WAN), the Internet, or a combination thereof. The example environment 100 also includes a search system 104, a search index 106, an action trail data store 108, an aggregated task data store 112, user devices 114, and resources 116. While the search system 104 and task aggregation system 110 are depicted separately, they may be realized as part of a single system.

A resource 116 is any data that can be provided over the network 102. A resource 116 is identified by a resource address that is associated with the resource 116. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts).

A user device 114 is an electronic device that is under control of a user and is capable of requesting and receiving resources 116 over the network 102. Example user devices 114 include personal computers, mobile communication devices, and other devices that can send and receive data over the network 102. A user device 114 typically includes a user application, such as a web browser, to facilitate the sending and receiving of data over the network 102.

User devices 114 can submit search queries to the search system 104 over the network 102. In response, the search system 104 accesses a search index 106 to identify resources 116 that are relevant to the search query. The search system 104 identifies the resources 116 in the form of search results and returns the search results to the user devices 114 in search results pages. A search result is data generated by the search system 104 that identifies resources 116 that are responsive to a particular search query, and typically includes a link to the resources 116. An example search result can include a web page title, a snippet of text or a portion of an image extracted from the web page, and the URL of the web page or other relevant resource.

For example, a user that is interested in a finding a hotel for a vacation may research hotels by submitting one or more search queries to the search system 104 in an effort to identify information that will assist the user in finding details about various hotels. Thus, a user that is interested in finding a hotel in Kenya may submit search queries such as "hotels in Kenya," "What are the best hotels in Kenya," "Hotel Brand X in Kenya." In response to each of these search queries, the user may be provided search results that have been identified as responsive to the search query (e.g., have at least a minimum threshold relevance to the search query, for example, based on cosine similarity measures or clustering techniques). The user can then select one or more of the search results to request presentation of a web page or another resource 116 that is referenced by a URL associated with the search result.

Each user may research multiple related topics as part of a greater body of research. For example, a user that is interested in planning a vacation may submit queries to the search system 104 for hotels, flights, travel visa information, immunizations, or other information related to vacation planning. Provided the user has opted-in or otherwise chosen to allow the search system 104 to store a web history, the web history may be kept for the user performing research on the network 102 using the search system 104. Web history provides a history of user activities performed sequentially in a time period. The user activities may be user actions associated with various resources (e.g., webpages, images, or other resources) on the web. In some implementations, stored web histories may also be anonymized.

The search system 104 generates action trails for a user from that user's web history, and stores them in the action trail data store 108. Action trails are sequences of user activities that are grouped together based on semantic and temporal criteria (e.g., when the user activities are related to each other semantically and temporally). Each action trail is specific to one user. In some implementations, action trails are one-dimensional strings of temporally ordered events, starting from the most recent and going back in time. In some implementations, an event is a recorded user action (e.g., a page view, copying text) or inaction (e.g., no page view) for a particular resource (e.g., a webpage). An event is an entry in the web history, and describes actions taken and inactions on the part of the user. For example, for the query "Kenya travel," the events may include the query, the search results presented to the user, and the search results the user selected. The event also includes other user activity information (e.g., time, number of visits, etc.). Action trails are used, for example, to aid users in creating and reestablishing context across fragmented research activity without requiring the users to explicitly structure and organize the material. Action trails are more specifically described with reference to FIG. 2 below.

The task aggregation system 110 builds on the utility of action trails by aggregating action trail data for multiple users. In some implementations, the task aggregation system accesses the action trail data stored in the action trail data store 108, and clusters the action trails according to particular tasks. For example, the task aggregation system 110 may determine a particular task, e.g., "Kenya travel", and accesses all action trails that correspond to this task. Thus, task data for multiple users relating to Kenya travel are clustered into an action trail cluster for "Kenya travel." In some implementations, an action trail cluster may be defined by the action trails included in that cluster such that the task associated with the cluster may not be explicitly identified. For example, action trails may be clustered based on similarities in the action trail data alone, regardless of any identified task associated with any particular action trail. The task aggregation system 110 stores the action trail clusters in the aggregated task data store 112. The task aggregation system 110 also ranks the resources corresponding to each action trail cluster according to topics of the particular task to which the action trail cluster corresponds. For example, resources related to "flights to Kenya" may be ranked separately from resources related to "hotels in Kenya." The ranking of resources within each action trail cluster is more specifically described with reference to FIG. 2 below.

In some implementations, a user may perform research using the search system 104 while engaged in a particular task (e.g., planning a trip to Kenya). The particular task may be identified by the user or by the search system 104 (e.g., by using semantic and temporal analysis of a user's web history). For example, the search system may determine that a user is planning a trip to Kenya based on the user's recent search queries: "flights to Kenya" and "do I need a travel visa to visit Kenya," and user actions taken on resources presented in response to those queries.

If it is determined that a user is engaged in a particular task, the task aggregation system 110 identifies an action trail cluster that corresponds to the particular task and provides data identifying one or more task relevant resources for presentation to the user. The task relevant resources can be identified independent of the user's historical actions for the topics.

For example, a user engaged in the task of planning a trip to Kenya may submit the query, "flights to Kenya" to the search system 104. The task aggregation system 110 identifies the "Kenya travel" action trail cluster, which contains action trails including data identifying resources related to the topics "flights to Kenya" and "hotels in Kenya." The task aggregation system 110 provides the search system 104 with data identifying at least one resource related to hotels in Kenya. The search system 104 may then present the user with data identifying resources relevant to the user's query, and/or resources relevant to the task, "Kenya travel," that may not otherwise be relevant to the user's query. As described in the foregoing example, the user may be presented with data identifying resources that were included in action trails of previous users who were planning a trip to Kenya, thus helping the user by using the research of others. The process of providing data identifying task relevant resources is more specifically described with reference to FIG. 3 below.

Figure 2:
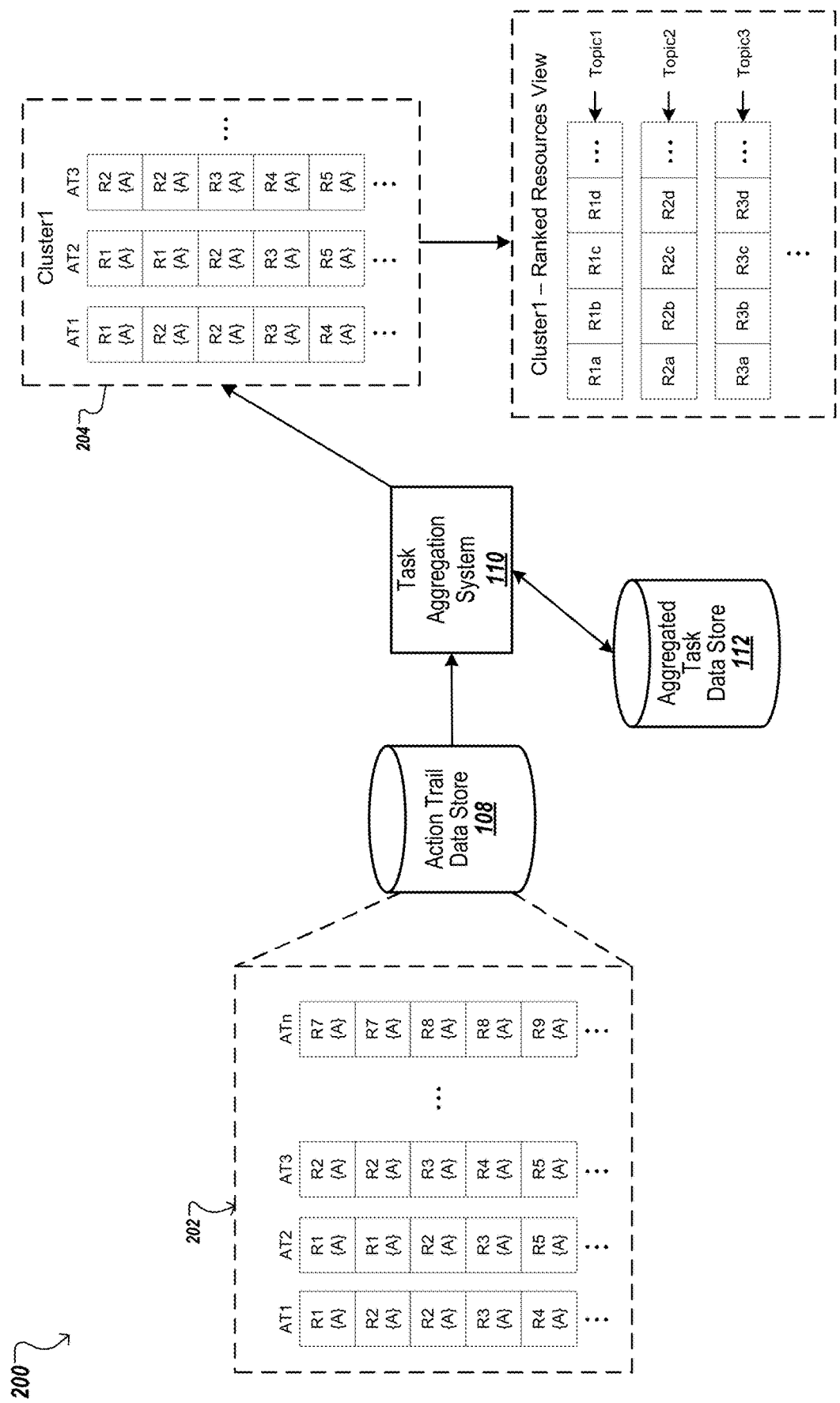
FIG. 2 is an illustration of an example data flow in which action trails are clustered and their corresponding resources are ranked.

FIG. 2 is an illustration of an example data flow 200 in which action trails are clustered and their corresponding resources are ranked. The task aggregation system 110 accesses data defining action trails 202 stored in the action trail data store 108. Each action trail (e.g., AT1, AT2, AT3 . . . ATN) corresponds to a particular task (and, if applicable, topic(s)) for a particular user, and is defined data describing a sequence of user actions (e.g., {A}) taken by the particular user with regard to particular resources (e.g., R, where R is represented by the URL of the resource, or some other resource identifier) that correspond to the particular task. For example, AT1 includes data defining the particular task as "Kenya travel," and represents represent an action trail related to that task. Resource R1 may be a resource related to a first topic, "flights to Kenya," resources R2 may be resources related to a second topic, "hotels in Kenya," resource R3 may be a resource related to a third topic, "safaris in Kenya," and resource R4 may be a resource related to a fourth topic, "immunizations for Kenya." Each resource is associated with a corresponding set of actions for that resource (e.g., {A}). Example actions include viewing the resource, a click on a resource link, a search query entry or submission, etc. The generation of action trail data is done by the search system 104, or another system in data communication with the search system 104.

The task aggregation system 110 clusters the action trails into action trail clusters 204 according to their particular tasks. For example, action trail cluster 204 is identified by a cluster identifier and represents the cluster associated with the task, "Kenya travel." Each action trail (AT1, AT2, AT3 . . . ) in the cluster 204 corresponds to the task "Kenya travel," and each resource R corresponding to the cluster 204 relates to a topic of the task, "Kenya travel." The cluster identifier need not be human readable, and in some implementations, may be as simple as an identifier of the topics within the action trail cluster 204.

In some implementations, each action trail cluster is associated with a similarity threshold (e.g., a semantic similarity threshold), and action trails associated with the action trail cluster must meet or exceed the similarity threshold. Such similarity thresholds can be determined by the particular aggregation technique used, e.g., K-means clustering, agglomerative cluster, etc. Similarity of action trails may be determined, for example, by a semantic similarity between action trail tasks, topics, resources, and/or actions, or some other similarity/distance metric. Likewise, a resource included in an action trails may be associated with a topic when the resource meets a similarity threshold for that topic.

In some implementations, determining similarity between action trails may involve analysis of the resources and topics included in each action trail. For example, one action trail may be deemed similar to another action trail if they share a threshold number of resources. In some implementations, the similarity of action trails is determined based on similarity of topics represented by the resources included in the action trails. For example, AT1 and AT2 may share the same cluster due to the similarity of the topics identified for each action trail (e.g., AT1 and AT2 each include resources related to topics R1, R2, and R3). An example threshold in the foregoing example may require that a predetermined number, or a certain percent, of the topics represented in a particular action trail match topics included in an action trail cluster.

The task aggregation system 110 ranks the resources to which the action trails included in the cluster 204 correspond according to the topics of the particular task. For example, the resources of the "Kenya travel" cluster 204 are ranked according to the various topics associated with planning a trip to Kenya. In the example ranked resources view of cluster 204, Topic1 may correspond to the topic, "flights to Kenya," corresponding resource R1$a$ may be the top ranked resource for the topic, "flights to Kenya." In this example, R1$b$ represents the second ranked resource for "flights to Kenya," while R1$c$ and R1$d$ are ranked third and fourth, respectively. Topic2 may correspond to the topic, "hotels in Kenya," and the corresponding resources associated with that topic (e.g., R2$a$, R2$b$, R2$c$, R2$d$, etc.) are ranked accordingly.

In some implementations, the resources are ranked according to one or more metrics corresponding to each resource. For example, the resources related to the topic, "flights to Kenya," might be ranked according to their click through rate (e.g., the rate at which the resource is selected when a link to the resource is presented in response to a query) or authority score (e.g., the weight attributed to the resource in a directed graph representation of the Internet or portion of the Internet). Other example metrics include user ratings associated with each resource, average time spent viewing a resource, amount of textual content, and layout of the resource. The foregoing metrics are example metrics only, and another appropriate metric, or combination of appropriate metrics, may be used to rank the resources with respect to the particular cluster.

Figure 3:
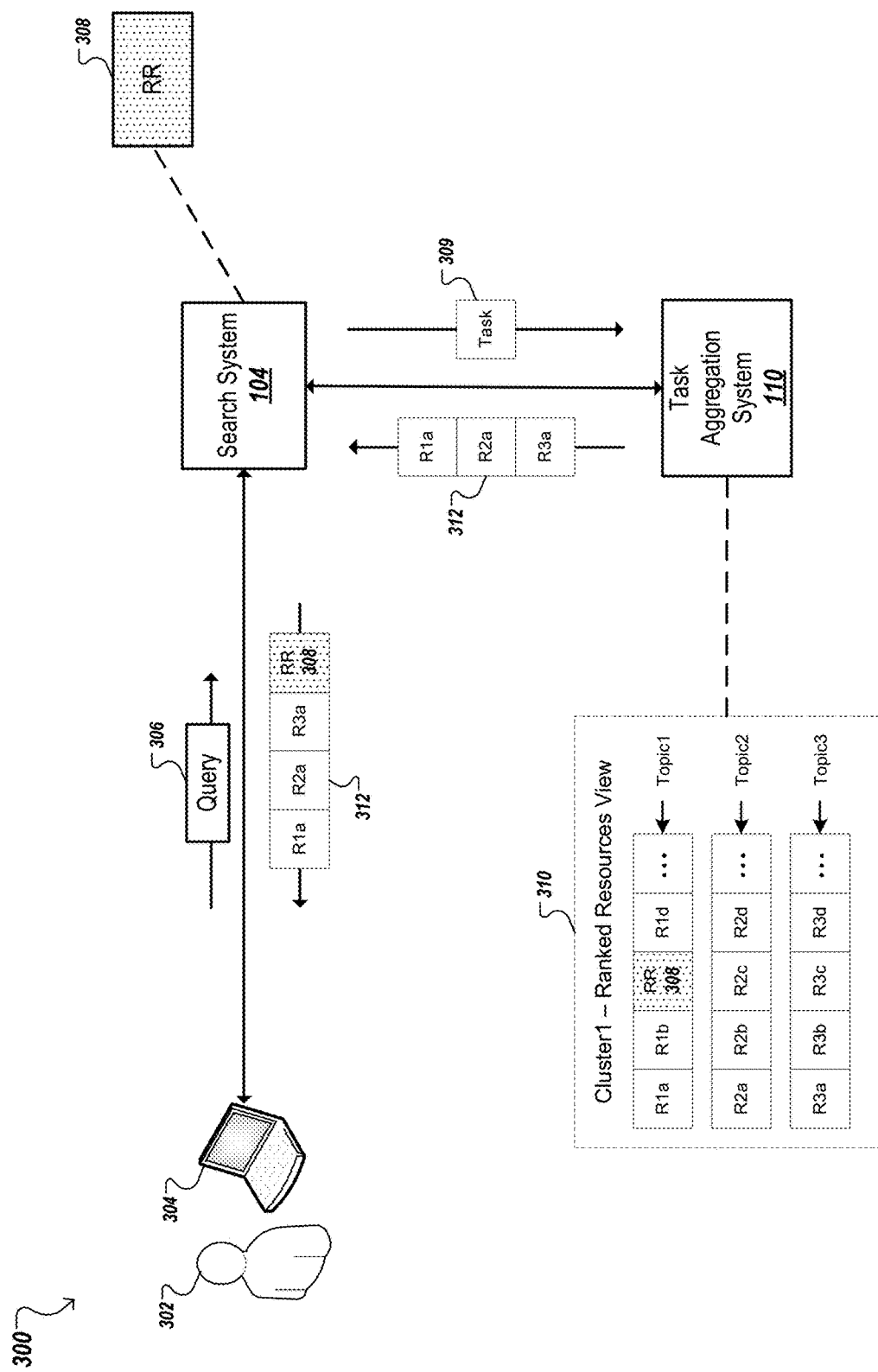
FIG. 3 is an illustration of an example data flow in which task-relevant resources are provided in response to a query.

FIG. 3 is an illustration of an example data flow 300 in which task relevant resources are provided in response to a query. In some implementations, a user 302 uses a user device 304 to submit a query 306 to the search system 104. For example, a user might enter the query, "ABC airline flights to Kenya" and submit it to a search engine. The search system 104 identifies a query relevant resource 308, which is determined by the search system to be responsive to the user's query, and submits the query relevant resource to the task aggregation system 110.

The search system 104 determines that the user 302 is engaged in a particular task. The determination of whether a user is engaged in a particular task can be based on a variety of factors, and the threshold can be tuned so as to require the user to submit multiple queries and take several actions related to a particular task before a positive determination is made. For example, the search system 104 may determine, based on the user's web history (e.g., web pages visited, recent search queries, actions the user takes on various resources, etc.) and/or a current query (e.g., "ABC airline flights to Kenya") that the user 302 is engaged in planning a trip to Kenya. Alternatively, the threshold can be a single occurrence of a query related to the particular task. A user need not be logged into any particular service for the determination to be made; and, in some implementations, a user is only identified using an IP (internet protocol) address, and a search query (or other action) is the only data upon which the determination is made.

In some implementations, a user 302 also requires explicit indication that the user 302 is engaged in a particular task. For example, the search system 104 may prompt the user 302, through the user device 304, for an indication that the user is engaged in a task, such as presenting a hyperlink with the text "are you planning a trip to Kenya?" to the user. User interaction with the hyperlink will indicate that the user is engaged in the task, "Kenya travel."

If the search system 104 determines the user is not engaged in a particular task, then the search system 104 provide search results that identify resources that the search system 104 determines to be responsive to the query. For example, the search system 104 may send search results that identify the resource 308, and that identify other resources. Because the resource 308 is responsive to the instant query, it is referred to as a "query relevant" resource.

Once the search system 104, however, determines the user is engaged in a particular task, the system 104 notifies the task aggregation system 110 that the user is engaged in the particular task, e.g., task 309, which corresponds to "Kenya travel."

The task aggregation system 110 identifies an action trail cluster 310 corresponding to the particular task 309, e.g., action trail cluster 310, which is the cluster for "Kenya travel." The task aggregation system 110 identifies at least one task relevant resource. A task relevant resource is a resource corresponding to an action trail that, in turn, corresponds to an action trail cluster for the particular task. For example, a task relevant resource for the task "Kenya travel," may be any of the resources corresponding to an action trail included in the action trail cluster of the task, "Kenya travel." A task relevant resource that is identified need not, however, be identified for a particular query that the user submitted, as long as the user is determined to be engaged in the task. In other words, a task relevant resource is a resource that is relevant to a task, but is not necessarily relevant to each query for the particular task. Thus, when a user is determined to be engaged in a task, a task relevant resource that is not a query relevant resource for an instant query may be identified for the instant query.

Thus, in some implementations, the task aggregation system 110 identifies, as a task relevant resource, others resources that belong to the same topic as the query-relevant resource 308. For example, if the query relevant resource 308 is a web page for ABC airline's flights to Kenya (depicted in FIG. 3 as RR), and the resource belongs to the action trail cluster 310 and to Topic1, resource R1*a* and/or R1*b* may be identified as a task relevant resource. Resource R1*a* is, for example, a web page for XYZ airline's flights to Kenya, and resource R1*b* is a web page with the schedule of flights to Kenya from three other different airlines.

In additional implementations, the task aggregation system 110 identifies, as a task relevant resource, a resource associated with a topic that is different from the topic associated with the query relevant resource. For example, the query relevant resource is associated with Topic1 (e.g., flights to Kenya), and the task aggregation system 110 thus identifies a resource associated with Topic2 (e.g., hotels in Kenya) and/or Topic3 (e.g., Safaris in Kenya) as a task relevant resource.

In some implementations, the task aggregation system 110 only identifies task relevant resources from action trails which are associated with a user who has a threshold degree of similarity with the user issuing the instant query. For example, if the user who issues the query is from the United States (e.g., determined via a user profile or IP address), the task aggregation system may only identify a task relevant resource from an action trail associated with another user from the United States. Degree of similarity may be determined based on any appropriate factors, such as location, gender, or search history of users.

Identifying at least one task relevant resource 312 from each topic of the identified action trail cluster 310 helps inform the user of other sub-topics that the user may want or need to research when engaged in a particular task. For example, if there are three topics (Topic1, Topic2, and Topic3), the task relevant resources may include at least one resource from each topic (e.g., R1*b*, R2*c*, R3*d*). By way of further example, assume the identified action trail cluster is related to the task "Kenya travel", and the topics are "Flights to Kenya," "Hotels in Kenya," and "Safaris in Kenya." Accordingly, the task relevant resources may include a web page for XYZ airline's flights to Kenya, a web page with a listing of all major hotels in Kenya, and a web page including reviews of Safaris in Kenya.

In some implementations, the task aggregation system 110 identifies at least one task relevant resource 312 based on the ranking of the resources according to each corresponding topic of the identified action trail cluster 310. For example, action trail cluster 310 depicts a ranked resources view of the action trail cluster, and each resource is ranked within each topic (e.g., R1*a* is ranked higher than R1*b*, which is ranked higher than query-relevant resource RR, etc.). In the example data identifying at least one task relevant resource 312, the top ranked resource from each topic are identified as task relevant resources to be provided to the user.

The task aggregation system 110 provides data identifying the task relevant resources 312. While the query relevant resource 308 may be the most relevant resource for the user's query 306, the user 302 is also provided with task relevant resources 312. For example, the task aggregation system may provide data identifying task relevant resources R1*a*, R2*a*, and R3*a* to the search system 104 for eventual display on the user device 304, along with data identifying the query relevant resource 308.

Figure 4A:
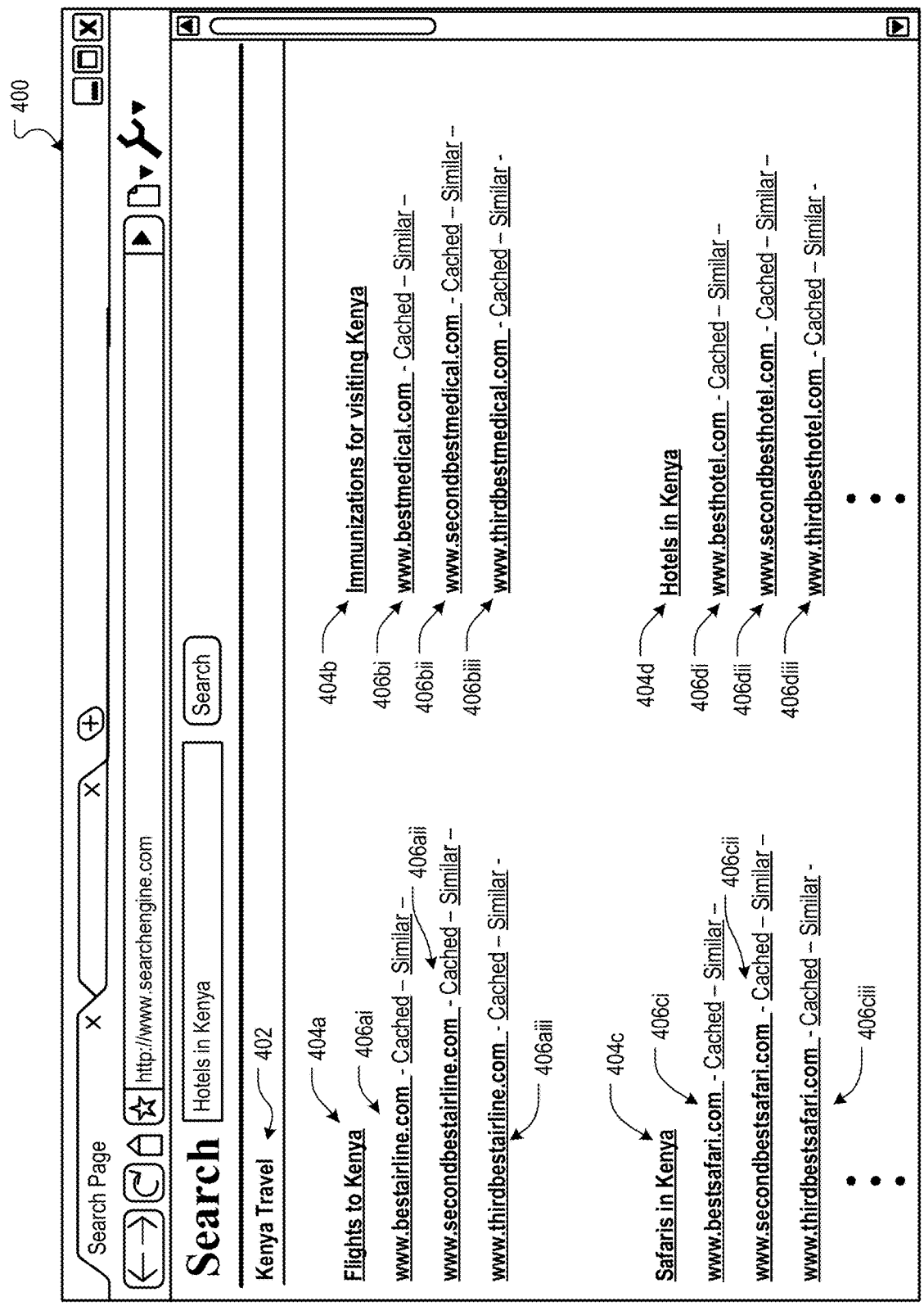
FIG. 4A is an illustration of an example task environment.

The presentation of data identifying task relevant resources can be done in a variety of ways, such as the environment depicted in FIG. 4A, which is an illustration of an example task environment 400 in which links to task relevant resources are displayed. The task environment 400 includes a plurality of reference groups (e.g., 404*a*-404*d*), and each reference group corresponds to a particular topic of the action trail cluster. For example, "Flights to Kenya,"

404*a*, "Immunizations for visiting Kenya," 404*b*, "Safaris in Kenya," 404*c* and "Hotels in Kenya," 404*d* are reference groups that correspond to different topics of the action trail cluster associated with the task 402, "Kenya travel."

Each group includes references to resources (e.g., 406*ai*-406*diii*) corresponding to action trails included in the action trail cluster associated with the particular task. For example, task environment 400 includes references to resources 406*ai*-406*diii*, which correspond to action trails included in the action trail cluster associated with the task 402, "Kenya travel." Thus, for the topic 404*a*, "Flights to Kenya," the references to resources corresponding to the particular topic are "www.bestairline.com," 406*ai*, "www.secondbestairline.com," 406*aii* and "www.thirdbestairline.com."

In some implementations, the references (e.g., 406*ai*-406*diii*) are ranked in the task environment according to the ranking of their corresponding resources and only the top N ranked resources are identified. In variations of this implementation, clicking on a group heading (e.g., 404*a*, 404*b*, 404*c*, and 404*d*) results in another web page being displayed, in which a more complete list of resources pertaining to the selected topic is displayed.

Figure 4B:
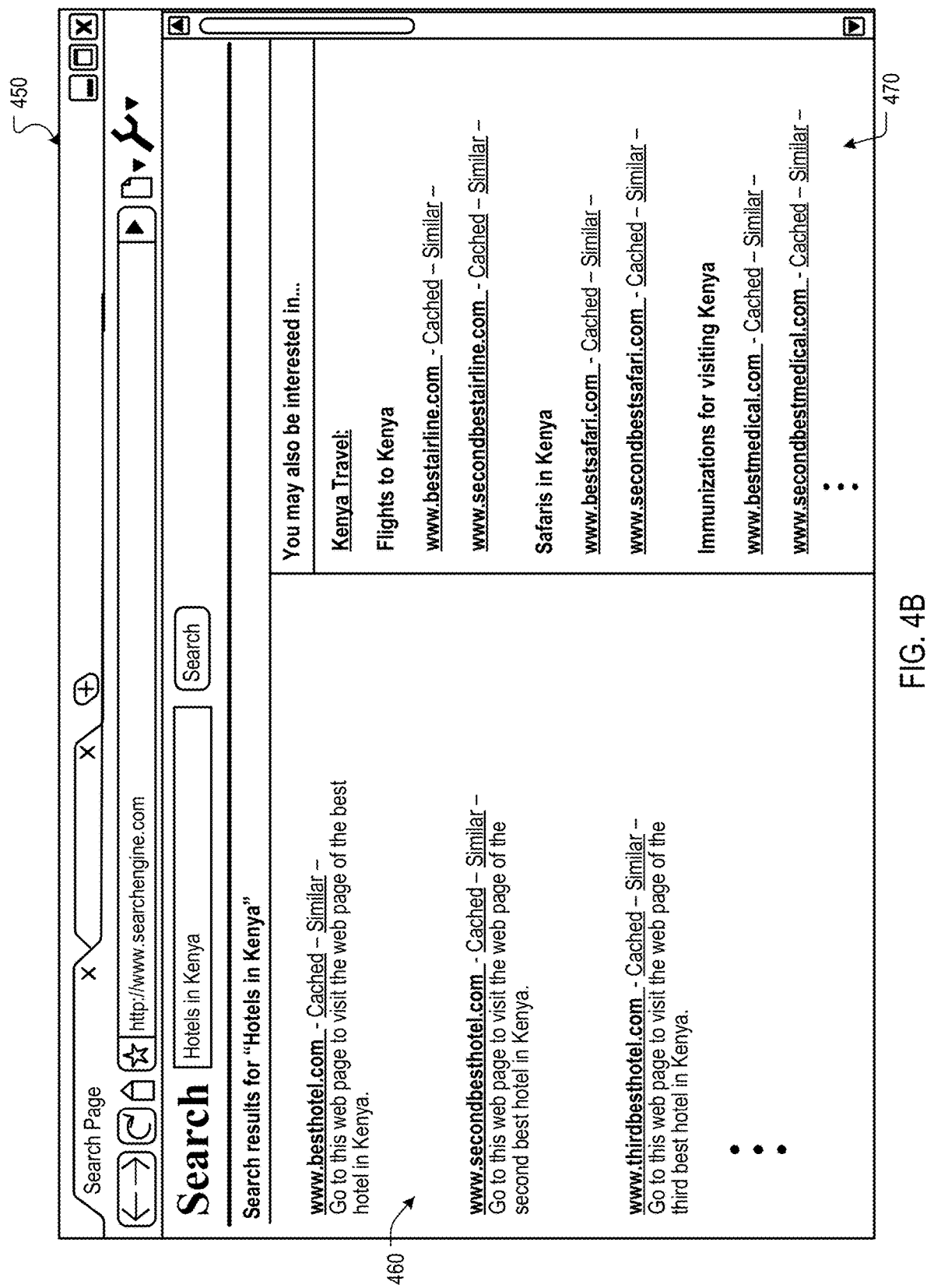
FIG. 4B is an illustration of a second example task environment.

Another example environment for presentation of task relevant resources is shown in FIG. 4B, which is an illustration of a second task environment 450 in which links to task relevant resources are displayed. Search results for query-relevant resources can be provided in a first portion 460 of a search results page, and search results for task relevant resources that are not included in the query relevant resources can be provided in a second portion 470 of the search results page. The second portion of the search results page is visually distinguished from the first portion, e.g., the second portion may be presented as a framed section with the heading, "You may also be interested in . . . ," followed by links or search results for task relevant resources. In some implementations, task relevant resources may simply be provided along with standard search results (e.g., in the same results page with query relevant resources).

Figure 5:
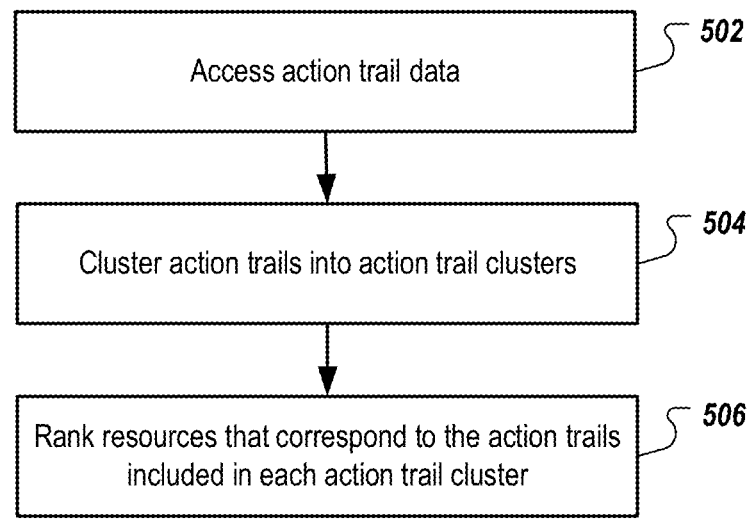
FIG. 5 is a flow chart of an example process for aggregating task data from tasks of multiple users.

FIG. 5 is a flow chart of an example process 500 for aggregating human tasks. The process 500 may be used by a data processing apparatus that is used to realize task aggregation system 110.

Action trail data is accessed (502). The action trail data defines action trails, and each action trail corresponds to a particular task and corresponding resources related to one or more topics of the particular task, and is defined by a sequence of user actions for a particular user corresponding to the resources. For example, an action trail corresponding to the task, "Kenya travel," and corresponding to resources related to planning a trip to Kenya may be defined by a particular user's web history while conducting research for a trip to Kenya. Example web history might include web pages visited (e.g., a web page for flights to Kenya, a web page for hotels in Kenya, etc.), search queries submitted to one or more search engines, and clicking on various search results and hyperlinks. The action trail data can be provided by the search engine 104, or some other entity that generates and provides such data.

Action trails are clustered into action trail clusters (504). The action trails are clustered based on the action trail data, and each action trail cluster corresponds to a set of particular topics that collectively define a task associated with the action trail cluster. In some implementations, each action trail cluster comprises one or more action trails corresponding to the particular task of the action trail cluster, and each of the action trails meets a similarity threshold for the action trail cluster to which the action trail belongs. Any appropriate clustering algorithm can be used to generate the action trail clusters by tasks and topics.

Resources that correspond to the action trails included in the action trail cluster are ranked (506). In some implementations, the resources are ranked according to topics of the particular task corresponding to the action trail cluster. For example, if the particular task is "Kenya travel," the corresponding resources may be ranked according to the topics, "flights to Kenya," "hotels in Kenya," "restaurants in Kenya," etc.

In some implementations, each topic is associated with resources to which the action trails included in the action trail cluster correspond, and that meets or exceeds a similarity threshold for that topic. For example, a topic "entertainment in Kenya" may have a low similarity threshold, such that many resources (e.g., resources related to Kenyan restaurants, athletic events, and safaris) are associated with it. In another example, a topic, "safaris in Kenya," may have a higher similarity threshold than "entertainment in Kenya," such that only resources which are very similar to it become associated with it. Similarity of resources may be determined, for example, by a semantic similarity between resources, and/or actions associated with each resource.

In some implementations, ranking the resources further comprises ranking the resources according to a click through rate (CTR) associated with each resource, the CTR being a rate at which a resource is selected when presented to a user in response to a query. Additionally or optionally, other metrics can also be used for ranking resources. For example, the top-ranked resource for the topic, "flights to Kenya," may be the resource with the highest CTR.

Figure 6:
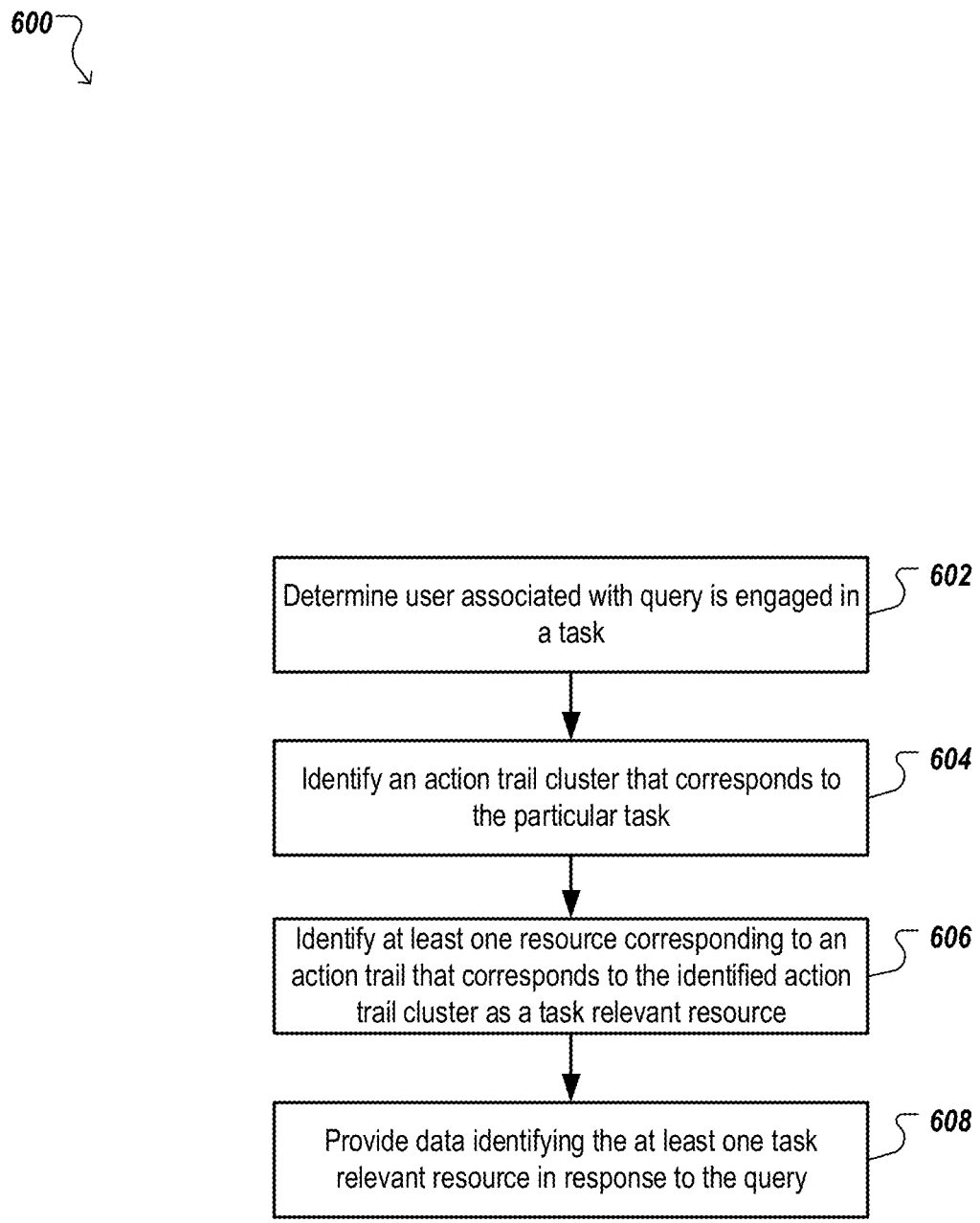
FIG. 6 is a flow chart of an example process for providing task relevant resources.

FIG. 6 is a flow chart of an example process for providing task relevant resources. The process 600 may be used by a data processing apparatus that is used to realize task aggregation system 110.

The system determines a user is engaged in a task (602). In some implementations, a user provides an explicit indication that the user is engaged in a particular task. In other implementations, the system determines that a user is engaged in a particular task based the user's web history and/or a queries submitted to a search system.

An action tail cluster that corresponds to the particular task is identified (604). In some implementations, the task aggregation system identifies an action trail cluster that corresponds to the particular task that was identified in step 602. In another implementation, the task aggregation system identifies an action trail cluster which includes an action trail for which a query relevant resource is a corresponding resource.

At least one resource corresponding to an action trail that corresponds to the identified action trail cluster is identified as a task relevant resource (606). In some implementations, identifying the at least one task relevant resource comprises identifying at least one task relevant resource from each topic of the identified action trail cluster. In some implementations, identifying the at least one task relevant resource comprises identifying at least one task relevant resource based on the ranking of the resources according to each corresponding topic of the identified action trail cluster. For example, the task aggregation system may identify, as task relevant resources, the top two resources from each topic of the identified action trail cluster.

Data identifying the at least one task relevant resource is provided (608). In some implementations, the data identifying the at least one task relevant resource is provided to a user's device for display to the user. In some implementations, the data identifying at least one task relevant resource is provided to a search system, which may combine at least one query relevant resource with the at least one task relevant resource before providing the data to a user's device.

In some implementations, providing data identifying the at least one task relevant resource comprises providing data for generating a display of a task environment to the user, wherein the task environment includes references the at least one task relevant resource. An example task environment is described more fully with reference to FIG. 4 above.

Figure 7:
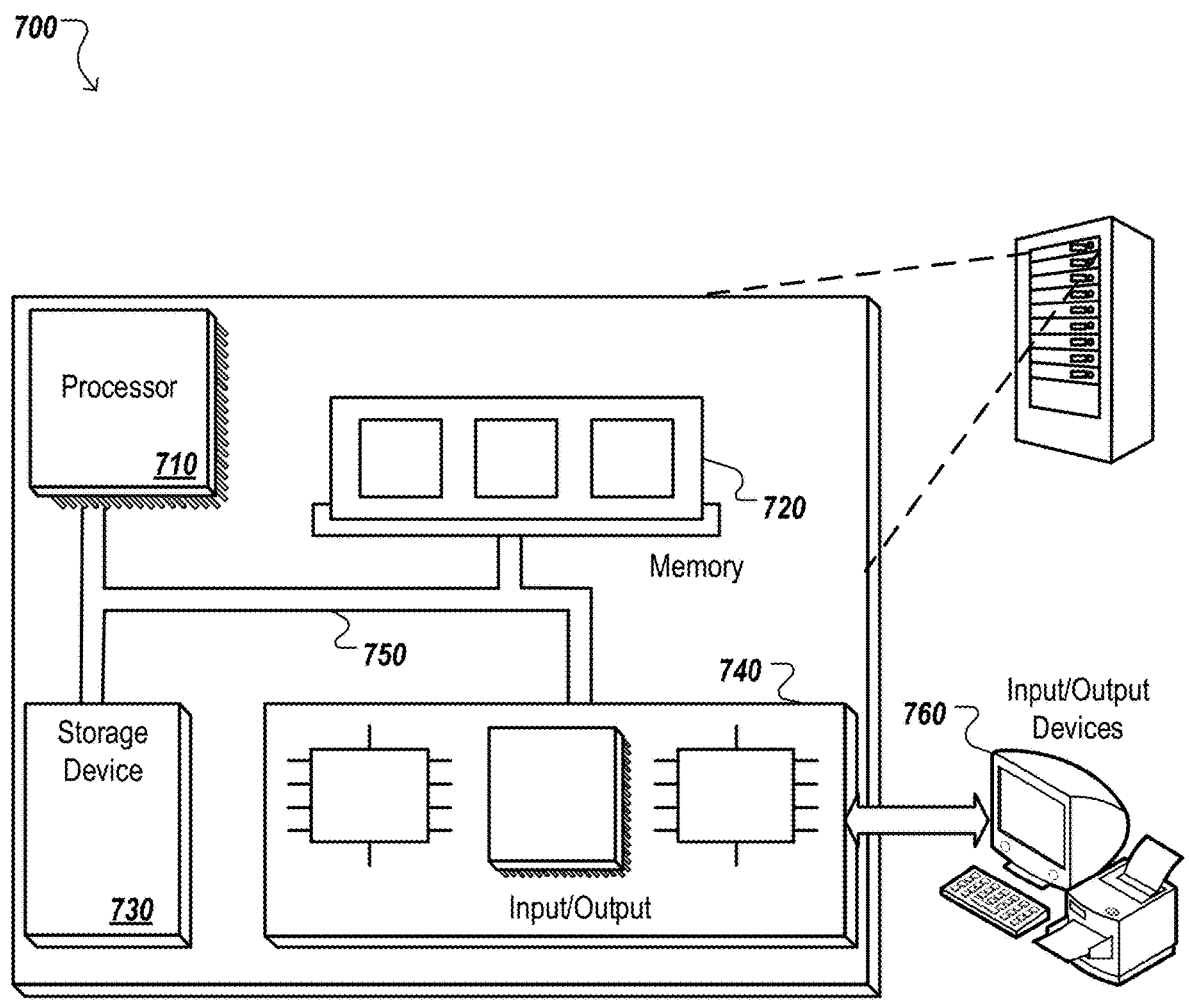
FIG. 7 is a block diagram of an example data processing apparatus.

FIG. 7 is a block diagram of an example data processing apparatus 700 that can be used to perform operations described above. The apparatus 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the apparatus 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the apparatus 700. In one implementation, the storage device 730 is a computer-readable medium. In various different implementations, the storage device 730 can include, for example, a hard disk device, an optical disk device, a storage device that is shared over a network by multiple computing devices (e.g., a cloud storage device), or some other large capacity storage device.

The input/output device 740 provides input/output operations for the apparatus 700. In one implementation, the input/output device 740 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 760. Other implementations, however, can also be used, such as mobile computing devices, mobile communication devices, set-top box television client devices, etc.

Although an example data processing apparatus has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
  accessing, for each of a plurality of users, data specifying sequences of user actions taken by the user with respect to one or more resources that present content related to a particular task in which the user was engaged, wherein each particular task relates to a set of related topics;
  clustering the sequences of user actions into clusters based on the particular task to which each sequence corresponds, the clustering including:
    generating a respective cluster for each particular task, wherein each cluster corresponds to a respective particular task; and
    assigning, to each of the respective clusters, only the sequences of user actions taken by users with respect to one or more resources that present content related to the particular task;
  determining that a given user is engaged in a given task corresponding to a particular cluster based on the given user submitting a search query related to a first topic of the given task; and
  in response to determining that the given user is engaged in the given task corresponding to the particular cluster based on the given user submitting the search query related to the first topic of the given task, providing, for presentation to the given user via a user device of the given user, data identifying (i) a query-relevant resource that is responsive to the search query related to the first topic of the given task and (ii) one or more additional resources that are specified by one or more of the sequences of user actions assigned to the particular cluster, wherein the one or more additional resources are related to a second topic of the given task, and wherein providing the data comprises:
including, in the data, (i) the query-relevant resource that is responsive to the search query related to the first topic and (ii) the one or more additional resources that are related to the second topic, wherein including the one or more additional resources that are related to the second topic is responsive to the one or more additional resources being specified by one or more of the sequences of user actions assigned to the particular cluster for the given task and is responsive to determining that the given user is engaged in the given task corresponding to the particular cluster based on the given user submitting the search query related to the first topic of the given task.

2. The method of claim 1, wherein each sequence of user actions, of the sequences of user actions, is assigned to a cluster in response the sequence of user actions meeting a similarity threshold for the cluster.

3. The method of claim 2, wherein the one or more additional resources that are related to the second topic of the given task include a top ranked resource for the second topic.

4. The method of claim 1, further comprising generating, for each of the respective clusters, multiple resource rankings that include a separate resource ranking for each topic related to the particular task corresponding to the respective cluster, wherein the separate resource ranking for each topic includes only resources that (i) are specified by at least one of the sequences of user actions included in the respective cluster and (ii) present content related to the topic.

5. The method of claim 4, wherein providing the data that further comprises:
selecting, from each separate resource ranking, at least one resource in the separate resource ranking; and
providing the data based on the at least one resource from each separate resource ranking.

6. The method of claim 4, wherein generating the separate resource ranking for a given topic related to the particular task of the respective cluster further comprises ranking the resources related to the given topic according to a click through rate associated with each resource, the click through rate being a rate at which a resource is selected when presented to a user in response to a query.

7. The method of claim 1, wherein determining that the given user is engaged in the given task is further based on explicit user feedback indicating that the given user is engaged in the given task.

8. The method of claim 1, wherein determining that the given user is engaged in the given task is further based on the user's resource access history, the resource access history describing one or more user actions, each user action being associated with a resource upon which the user action is performed.

9. The method of claim 8, wherein providing the data further comprises:
generating a display of a topic environment to the given user, wherein the topic environment includes references to resources corresponding to sequences of user actions included in the particular cluster associated with the given task; and
including, in the data, the display of the topic environment.

10. The method of claim 9, wherein the topic environment includes a plurality of reference groups and each reference group corresponds to a particular topic of the particular cluster, and each reference group includes one or more references to resources corresponding to the particular topic of the cluster associated with the given task.

11. A system comprising:
a data processing apparatus comprising one or more computers; and
a data store storing instructions that, when executed by the data processing apparatus, cause the data processing apparatus to perform operations comprising:
accessing, for each of a plurality of users, data specifying sequences of user actions taken by the user with respect to one or more resources that present content related to a particular task in which the user was engaged, wherein each particular task relates to a set of related topics;
clustering the sequences of user actions into clusters based on the particular task to which each sequence corresponds, the clustering including:
generating a respective cluster for each particular task, wherein each cluster corresponds to a respective particular task; and
assigning, to each of the respective clusters, only the sequences of user actions taken by users with respect to one or more resources that present content related to the particular task;
determining, based on a given user submitting multiple queries related to a first topic of a given task corresponding to a particular cluster of the clusters, that the given user is engaged in the given task corresponding to the particular cluster; and
in response to determining that the given user is engaged in the given task corresponding to the particular cluster based on the given user submitting multiple queries related to the first topic of the given task corresponding to the particular cluster, providing, for presentation to the given user via a user device of the given user, data identifying (i) a query-relevant resource that is responsive to the search query related to the first topic of the given task and (ii) one or more additional resources that are specified by one or more sequences of user actions assigned to the particular cluster, wherein the one or more additional resources are related to a second topic of the given task.

12. The system of claim 11, wherein each sequence of user actions, of the sequences of user actions, is assigned to a cluster in response the sequence of user actions meeting a similarity threshold for the cluster.

13. The system of claim 11, wherein the operations comprise generating, for each of the respective clusters, multiple resource rankings that include a separate resource ranking for each topic related to the particular task corresponding to the respective cluster, wherein the separate resource ranking for each topic includes only resources that (i) are specified by at least one of the sequences of user actions included in the cluster and (ii) present content related to the topic.

14. The system of claim 13, wherein providing the data further comprises:
selecting, from each separate resource ranking, at least one resource in the separate resource ranking; and
providing the data based on the at least one resource from each separate resource ranking.

15. The system of claim 13, wherein generating separate resource ranking for a given topic related to the particular task of the respective cluster further comprises ranking the resources related to the given topic according to a click through rate associated with each resource, the click through rate being a rate at which a resource is selected when presented to a user in response to a query.

16. The system of claim 11, wherein determining that the given user is engaged in the given task is further based on receiving explicit user feedback indicating that the given user is engaged in the given task.

17. The system of claim 11, wherein providing the data further comprises:
generating a display of a topic environment to the given user, wherein the topic environment includes references to resources corresponding to sequences of user actions included in the particular cluster associated with the given task; and
including, in the data, the display of the topic environment.

18. The system of claim 17, wherein the topic environment includes a plurality of reference groups and each reference group corresponds to a particular topic of the particular cluster, and each reference group includes one or more references to resources corresponding to the particular topic of the cluster associated with the given task.

19. A non-transitory computer readable medium comprising instructions that, when executed by a data processing apparatus, cause the data processing apparatus to perform operations comprising:
accessing, for each of a plurality of users, data specifying sequences of user actions taken by the user with respect to one or more resources that present content related to a particular task in which the user was engaged, wherein each particular task relates to a set of related topics;
clustering the sequences of user actions into clusters based on the particular task to which each sequence corresponds, the clustering including:
generating a respective cluster for each particular task, wherein each cluster corresponds to a respective particular task; and
assigning, to each of the respective clusters, only the sequences of user actions taken by users with respect to one or more resources that present content related to the particular task;
determining that a given user is engaged in a given task corresponding to a particular cluster based on the given user submitting a search query related to a first topic of the given task; and
in response to determining that the given user is engaged in the given task corresponding to the particular cluster based on the given user submitting the search query related to the first topic of the given task, providing, for presentation to the given user via a user device of the given user, data identifying (i) a query-relevant resource that is responsive to the search query related to the first topic of the given task and (ii) one or more additional resources that are specified by one or more sequences of user actions assigned to the particular cluster, wherein the one or more additional resources are related to a second topic of the given task, and wherein providing the data comprises:
including, in the data, (i) the query-relevant resource that is responsive to the search query related to the first topic and (ii) the one or more additional resources that are related to the second topic, wherein including the one or more additional resources that are related to the second topic is responsive to the one or more additional resources being specified by one or more of the sequences of user actions assigned to the particular cluster for the given task and is responsive to determining that the given user is engaged in the given task corresponding to the particular cluster based on the given user submitting the search query related to the first topic of the given task.

20. The non-transitory computer readable medium of claim 19, wherein each sequence of user actions is assigned to a cluster in response the sequence of user actions meeting a similarity threshold for the cluster to which the sequence of user actions is assigned.

* * * * *